(12) United States Patent
Sekine (10) Patent No.: US 6,612,561 B2
(45) Date of Patent: Sep. 2, 2003

(54) SHEET FEEDER WITH MECHANISM FOR PROTECTING INPUT AND DISCHARGE OPENINGS AND IMAGE READING DEVICE INCLUDING THE SAME

(75) Inventor: Naofumi Sekine, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,241

(22) Filed: Nov. 2, 2001

(65) Prior Publication Data

US 2002/0056957 A1 May 16, 2002

(30) Foreign Application Priority Data

Nov. 13, 2000 (JP) ........................................ 2000-345378

(51) Int. Cl.$^7$ ................................................. B65H 5/00
(52) U.S. Cl. .................... 271/3.14; 271/9.01; 271/9.09; 271/145; 271/207
(58) Field of Search ................. 271/9.08, 162, 271/213, 3.14; 399/358, 498

(56) References Cited

U.S. PATENT DOCUMENTS 5,111,252 A * 5/1992 Hamada et al. ............. 399/393
6,029,969 A * 2/2000 Saitoh et al. ............... 271/4.02

FOREIGN PATENT DOCUMENTS

JP 9-86763 3/1997

\* cited by examiner

Primary Examiner—H. Grant Skaggs
Assistant Examiner—Kaitlin S Joerger
(74) Attorney, Agent, or Firm—Fitzpatrick, Cella, Harper & Scinto (57) ABSTRACT

A sheet feeder has a sheet-feed opening for feeding sheets into a sheet transporting path inside the sheet feeder; a sheet-discharge opening for discharging the sheets; a sheet-holding tray which is rotatably provided and which is movable to a position where the sheet-holding tray holds the sheets and to a location where the sheet-holding tray covers the sheet-feed opening; and a discharged-sheet holding tray which is rotatably provided and which is movable to a position where the discharged-sheet holding tray holds the sheets that have been discharged from the sheet-discharge opening and to a location where the discharged-sheet holding tray covers the sheet-discharge opening. When either one of the sheet-feed opening and the sheet-discharge opening that is disposed above the other is to be covered, the sheet-holding tray or the discharged-sheet holding tray is subjected to inversion rotation so that a surface of the sheet-holding tray or the discharged-sheet holding tray that is formed opposite to a sheet-loading surface thereof forms a surface of the body of the sheet feeder and when either of the sheet-feed opening and the sheet-discharge opening is to be covered, the sheet-holding tray or the discharged-sheet holding tray is moved so that the sheet-loading surface of the sheet-holding tray or the discharged-sheet holding tray forms the surface of the body of the sheet feeder in order to cover either of the other of the sheet-feed opening and the sheet-discharge opening.

26 Claims, 9 Drawing Sheets

FIG. 9

SHEET FEEDER WITH MECHANISM FOR PROTECTING INPUT AND DISCHARGE OPENINGS AND IMAGE READING DEVICE INCLUDING THE SAME

BACKGROUND OF THE INVENTION

1. Field of the Invention

The present invention relates to a sheet feeder that feeds sheets and an image reading device including the sheet feeder, and, more particularly, to a sheet feeder that is constructed so that a sheet-feed opening and a sheet-discharge opening that are formed in the sheet feeder are covered when they are not used.

2. Description of the Related Art

There are conventional image readers, such as scanners, and image reading devices, used in, for example, a printer, a copying machine, or a facsimile, that include sheet feeding means for feeding sheets to an image reading section. Such image reading devices including a sheet feeder that is provided at the top portion of the image reading device so as to be openable and closable are disclosed in Japanese Patent Laid-Open No. 9-86763 and the like.

There are sheet feeders of the above-described type that have a sheet-feed opening and a sheet-discharge opening. The sheet-feed opening is used for feeding sheets held by sheet-holder to a sheet transporting path that is provided inside the body of the sheet feeder. The sheet-discharge opening is used for discharging the sheets that have passed through the sheet transporting path towards discharged-sheet holder.

When the information on a sheet is to be read, after the sheet has been transported to the sheet transporting path from the sheet-feed opening, the sheet is caused to pass by a reading section in order for the information on the sheet to be read. After completion of the reading of the information on the sheet, the sheet passes through the sheet transporting path, and is, then, discharged from the sheet-discharge opening and is held by the discharged-sheet holder.

However, in such conventional sheet feeders having a sheet-feed opening and a sheet-discharge opening, the sheet-feed opening, the sheet-discharge opening, the sheet-holder, and the discharged-sheet holder are continuously exposed to the atmosphere, so that dirt and dust tend to accumulate on the sheet-holder and the discharged-sheet holder. Such accumulated dirt, dust, and other foreign matter tend to enter the inside of the sheet feeder from the sheet-feed opening and the sheet-discharge opening. This may cause the sheet feeder to become defective.

The sheet-holder and the discharged-sheet holder protrude from the body of the sheet feeder. Therefore, these two holders may get in the way when they are not used, and the sheet feeder may give the impression of having a complicated external appearance.

SUMMARY OF THE INVENTION

The present invention has been achieved in view of such a situation, and has as its object the provision of a sheet feeder that makes it possible to prevent entry of foreign matter inside the body of the sheet feeder, and that is constructed so that sheet-holder and discharged-sheet holder do not get in the way when they are not used. The present invention also has as its object the provision of an image reading device including the sheet feeder.

According to a first aspect of the present invention, there is provided a sheet feeder comprising a sheet-feed opening for feeding sheets into a sheet transporting path that is provided inside a body of the sheet feeder; a sheet-discharge opening for discharging from the body of the sheet feeder the sheets that have passed through the sheet-transporting path; sheet-holding means which holds the sheets that have been fed into the sheet-transporting path through the sheet feed opening, which is rotatably provided at the body of the sheet feeder, and which is movable between a position where the sheet-holding means holds the sheets and a position where the sheet-holding means covers the sheet-feed opening; and discharged-sheet holding means which holds the sheets that have been discharged, which is rotatably provided at the body of the sheet feeder, and which is movable to a position where the discharged-sheet holding means holds the sheets that have been discharged from the sheet-discharge opening and to a position where the discharged-sheet holding means covers the sheet-discharge opening. In the sheet feeder, when the one of the sheet-feed opening and the sheet-discharge opening that is disposed above the other is to be covered, the sheet-holding means or the discharged-sheet holding means is subjected to inversion rotation so that a surface of the sheet-holding means or the discharged-sheet holding means that is formed opposite to a sheet-loading surface thereof forms a surface of the body of the sheet feeder in order to cover either one of the sheet-feed opening and the sheet-discharge opening. On the other hand, when either of the other of the sheet-feed opening and the sheet-discharge opening is to be covered, the sheet-holding means or the discharged-sheet holding means is moved so that the sheet-loading surface of the sheet-holding means or the discharged-sheet holding means forms the surface of the body of the sheet feeder in order to cover either of the other of the sheet-feed opening and the sheet-discharge opening.

Of the sheet-feed opening and the sheet-discharge opening, the sheet-feed opening may be disposed above the sheet-discharge opening, and the sheet-discharge opening may be disposed below the sheet-holding means.

When, of the sheet-feed opening and the sheet-discharge opening, the sheet-feed opening is disposed above the sheet-discharge opening, and the sheet-discharge opening is disposed below the sheet-holding means, the discharged-sheet holding means may rotate to the position where the discharged-sheet holding means covers the sheet-discharge opening in response to the inversion rotation of the sheet-holding means when the sheet-feed opening is to be covered.

When, of the sheet-feed opening and the sheet-discharge opening, the sheet-feed opening is disposed above the sheet-discharge opening, and the sheet-discharge opening is disposed below the sheet-holding means, or when the discharged-sheet holding means rotates to the position where the discharged-sheet holding means covers the sheet-discharge opening in response to the inversion rotation of the sheet-holding means when the sheet-feed opening is to be covered, in the case where the sheet-feed opening and the sheet-discharge opening have been covered, the surface of the sheet-holding means opposite to the sheet-loading surface and the sheet-loading surface of the discharged-sheet holding means may be adjacent each other in order to form the surface of the body of the sheet feeder.

When, of the sheet-feed opening and the sheet-discharge opening, the sheet-feed opening is disposed above the sheet-discharge opening, and the sheet-discharge opening is disposed below the sheet-holding means, or when the discharged-sheet holding means rotates to the position where the discharged-sheet holding means covers the sheet-discharge opening in response to the inversion rotation of the sheet-holding means when the sheet-feed opening is to be covered, or when, in the case where the sheet-feed opening and the sheet-discharge opening have been covered, the surface of the sheet-holding means opposite to the sheet-loading surface and the sheet-loading surface of the discharged-sheet holding means is adjacent each other in order to form the surface of the body of the sheet feeder, the discharged-sheet holding means may comprise a protruding portion which protrudes upward from the sheet-loading surface of the discharged-sheet holding means when the discharged-sheet holding means is at the sheet-holding location, and which retreats from the sheet-loading surface of the discharged-sheet holding means when the discharged-sheet holding means is at the location where the discharged-sheet holding means covers the sheet-discharge opening.

When the structure of the first aspect is used, of the sheet-feed opening and the sheet-discharge opening, the sheet-discharge opening is disposed above the sheet-feed opening, and the sheet-feed opening is disposed below the discharged-sheet holding means.

According to a second aspect of the present invention, there is provided a sheet feeder comprising a sheet-feed opening for feeding sheets into a sheet transporting path that is provided inside a body of the sheet feeder; a sheet-discharge opening for discharging the sheets that have passed through the sheet-transporting path; sheet-holding means which holds the sheets that have been fed into the sheet-transporting path, which is rotatably attached to the body of the sheet feeder, and which is movable between a position where the sheet-holding means holds the sheets and a position where the sheet-holding means covers the sheet-feed opening; and discharged-sheet holding means which holds the sheets that have been discharged, which is rotatable provided at the body of the sheet feeder, and which is movable to a position where the discharged-sheet holding means holds the sheets that have been discharged from the sheet-discharge opening and to a position where the discharged-sheet holding means covers the sheet-discharge opening. In the sheet feeder, either one of the sheet holding means and the discharged-sheet holding means is disposed above the other at the sheet holding location, either one of the sheet holding means and the discharged-sheet holding means being subjected to inversion rotation so that a surface thereof disposed opposite to a sheet-loading surface thereof forms a surface of the body of the sheet feeder in order to cover either one of the sheet-feed opening and the sheet-discharge opening. On the other hand, when either of the other of the sheet holding means and the discharged-sheet holding means is used to cover either of the other of the sheet-feed opening and the sheet-discharge opening, the sheet holding means or the discharged-sheet holding means is moved so that the sheet-loading surface of the sheet holding means or the discharged-sheet holding means forms the surface of the body of the sheet feeder in order to cover either of the other of the sheet-feed opening and the sheet-discharge opening.

In the case where the structure of the second aspect is used, when either one of the sheet-feed opening and the sheet-discharge opening that is disposed above the other is to be covered, the sheet-holding means or the discharged-sheet holding means may be subjected to inversion rotation so that the surface of the sheet-holding means or the discharged-sheet holding means that is formed opposite to the sheet-loading surface thereof forms the surface of the body of the sheet feeder in order to cover either one of the sheet-feed opening and the sheet-discharge opening. On the other hand, when either of the other of the sheet-feed opening and the sheet-discharge opening is covered, the sheet-holding means or the discharged-sheet holding means may be moved so that the sheet-loading surface of the sheet-holding means or the discharged-sheet holding means forms the surface of the body of the sheet feeder in order to cover either of the other of the sheet-feed opening and the sheet-discharge opening.

When the structure of the second aspect or the structure using the structure of the second aspect is used, the sheet-feed opening may be disposed above the sheet-discharge opening, and the sheet-discharge opening may be disposed below the sheet-holding means.

When the sheet-feed opening is disposed above the sheet-discharge opening, and the sheet-discharge opening is disposed below the sheet-holding means, the discharged-sheet holding means may rotate to the position where the discharged-sheet holding means covers the sheet-discharge opening in response to the inversion rotation of the sheet-holding means when the sheet-feed opening is to be covered.

In the case where, of the sheet-feed opening and the sheet-discharge opening, the sheet-feed opening is disposed above the sheet-discharge opening, and the sheet-discharge opening is disposed below the sheet-holding means, or in the case where the discharged-sheet holding means rotates to the position where the discharged-sheet holding means covers the sheet-discharge opening in response to the inversion rotation of the sheet-holding means when the sheet-feed opening is to be covered, when the sheet-feed opening and the sheet-discharge opening have been covered, the surface of the sheet-holding means opposite to the sheet-loading surface and the sheet-loading surface of the discharged-sheet holding means may be adjacent each other in order to form the surface of the body of the sheet feeder.

In the case where, the sheet-feed opening is disposed above the sheet-discharge opening, and the sheet-discharge opening is disposed below the sheet-holding means, or in the case where the discharged-sheet holding means rotates to the position where the discharged-sheet holding means covers the sheet-discharge opening in response to the inversion rotation of the sheet-holding means when the sheet-feed opening is to be covered, or in the case where, when the sheet-feed opening and the sheet-discharge opening have been covered, the surface of the sheet-holding means opposite to the sheet-loading surface and the sheet-loading surface of the discharged-sheet holding means is adjacent each other in order to form the surface of the body of the sheet feeder, the discharged-sheet holding means may comprise a protruding portion that protrudes upward from the sheet-loading surface of the discharged-sheet holding means when the discharged-sheet holding means is at the sheet-holding location, and that retreats from the sheet-loading surface of the discharged-sheet holding means when the discharged-sheet holding means is at the location where the discharged-sheet holding means covers the sheet-discharge opening.

When the structure of the second aspect is used, of the sheet-feed opening and the sheet-discharge opening, the sheet-discharge opening may be disposed above the sheet-feed opening, and the sheet-feed opening may be disposed below the discharged-sheet holding means.

According to a third aspect of the present invention, there is provided an image reading device comprising a reading section that reads information of sheets; and any one of the above-described sheet feeders. These sheet feeders feed the sheets to the reading section.

In the present invention, the sheet holding means that holds the sheets that are fed into the sheet transporting path from the sheet-feed opening is rotatably provided at the body of the sheet feeder so that the sheet holding means is movable to the position where the sheet holding means holds the sheets and to the location where the sheet holding means covers the sheet-feed opening. The discharged-sheet holding means that holds the sheets that have been discharged from the sheet-discharge opening is rotatably provided at the body of the sheet feeder so that the discharged-sheet holding means moves to the position where the discharged-sheet holding means holds the sheets that have been discharged from the sheet-discharge opening to the location where the discharged-sheet holding means covers the sheet-discharge opening.

In addition, when either one of the sheet-feed opening and the sheet-discharge opening that is disposed above the other is to be covered, the sheet holding means or the discharged-sheet holding means is subjected to inversion rotation so that the surface of the sheet holding means or the discharged-sheet holding means opposite to the sheet-loading surface forms the surface of the body of the sheet feeder in order to cover either one of the sheet-feed opening and the sheet-discharge opening. When either of the other of the sheet-feed opening and the sheet-discharge opening is to be covered, the sheet-holding means or the discharged-sheet holding means is rotated so that the sheet-loading surface of the sheet-holding means or the discharged-sheet holding means forms the surface of the body of the sheet feeder in order to cover either of the other of the sheet-feed opening and the sheet-discharge opening.

As mentioned above, by covering the sheet-feed opening by the sheet holding means or by covering the sheet-discharge opening by the discharged-sheet holding means when the sheet holding means or the discharged-sheet holding means is not used, it is possible to prevent the entry of foreign matter inside the body of the sheet feeder.

When the sheet-feed opening and the sheet-discharge opening are covered by the sheet holding means and the discharged-sheet holding means, respectively, by forming i(F the surface of the body of the sheet feeder by the sheet holding means and the discharged-sheet holding means, it is possible to prevent the sheet holding means and the discharged-sheet holding means from getting in the way when they are not used.

Further objects, features and advantages of the present invention will become apparent from the following description of a preferred embodiment with reference to the attached drawings.

DESCRIPTION OF THE PREFERRED EMBODIMENT

Hereunder, a description of an embodiment of the present invention will be given with reference to the drawings.

Figure 1:
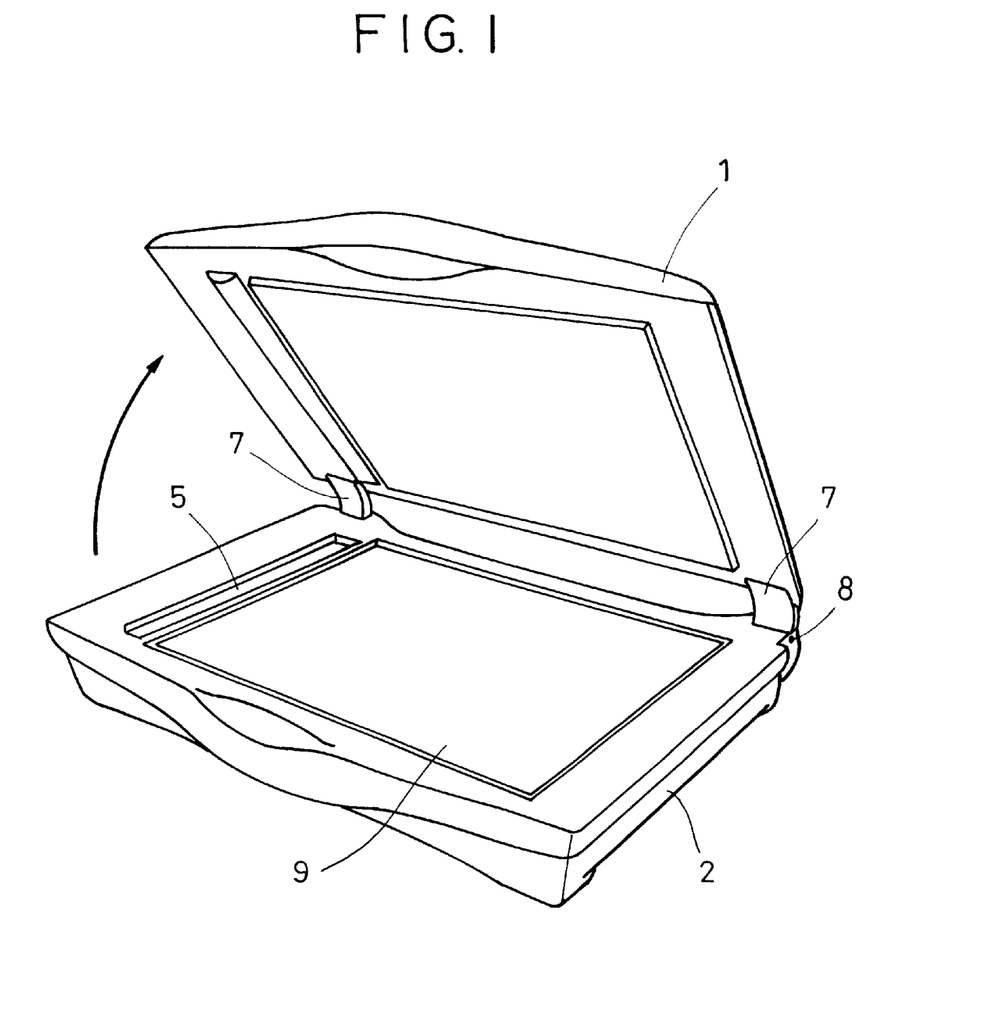
FIG. 1 is a perspective view of an image reading device (scanner) including a document feeder, which is an example of a sheet feeder of an embodiment of the present invention.
Figure 2:
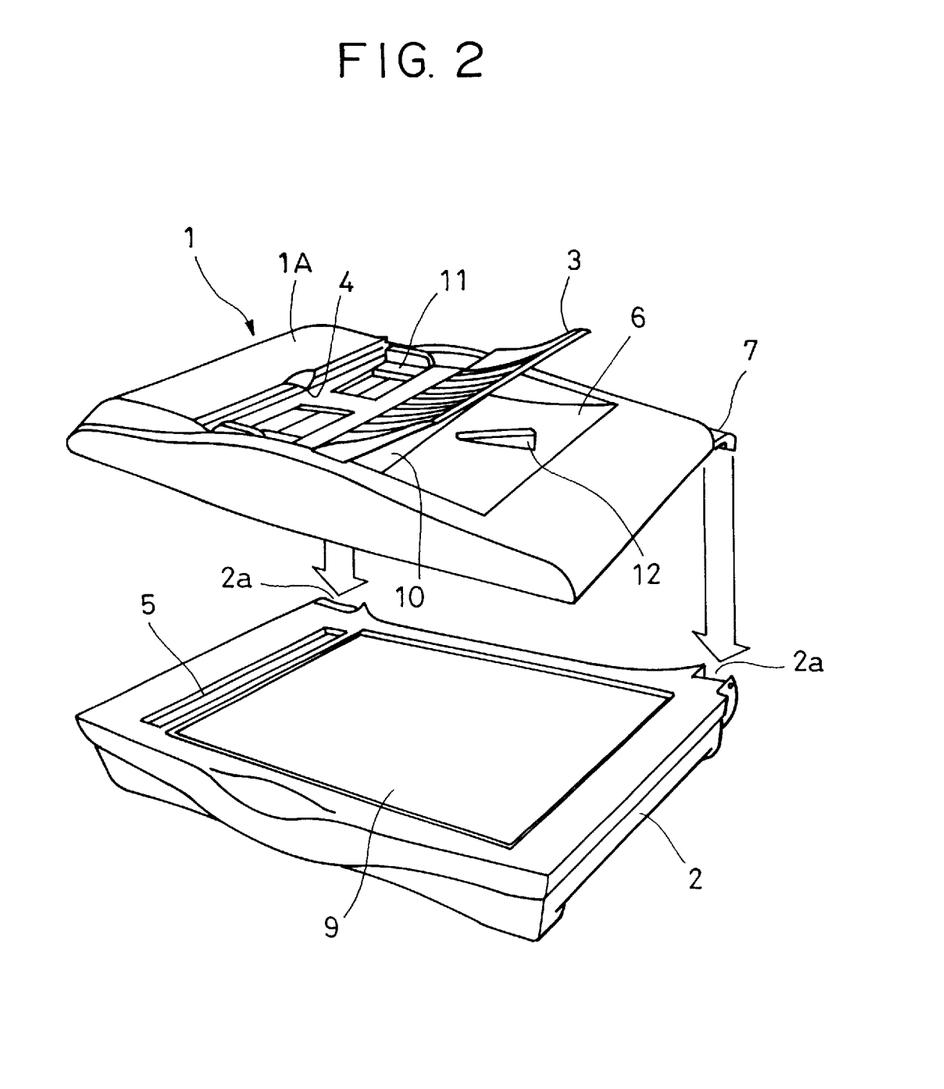
FIG. 2 is an exploded view of the image reading device.

FIG. 1 is a perspective view of an image reading device including a document feeder, which is an example of a sheet feeder of an embodiment of the present invention; and FIG. 2 is an exploded view thereof.

In FIGS. 1 and 2, reference numeral 1 denotes a document feeder, and reference numeral 2 denotes a flat head scanner (hereinafter referred to as the ".scanner"), which is an image reading device.

As shown in FIG. 2, the document feeder 1 is rotatable (that is, openable and closable) with respect to the scanner 2, which is disposed below the document feeder 1, by fitting hinges 7, which are provided on both sides of one end portion of a body 1A of the document feeder 1, to corresponding fitting holes 2a, which are provided in the scanner 2, and by rotatably supporting the hinges 7 by a hinge shaft 8 shown in FIG. 1.

Here, as shown in FIG. 2, the document feeder 1 includes a sheet-feed tray 3, serving as sheet-holding means, that holds originals (not shown), which are sheets, as a result of placing the originals thereupon. When the originals are set on the sheet-feed tray 3, and a reading start switch (not shown) is turned on or a reading start signal is input from a computer or a computer network (neither of which is shown), a sheet-feed roller and separating means 26 cause the originals to be separated and fed one at a time to a sheet-feed opening 4, which is provided at a downstream side of the sheet-feed tray 3 in a sheet-feeding direction.

The document feeder 1 also includes a sheet-discharge opening 10, disposed below the sheet-feed tray 3, for discharging the originals that have been read by the scanner 2. The originals that have been read by the scanner 2 are discharged from the sheet-discharge opening 10 in order to be held by a sheet-discharge tray 6, serving as discharged-sheet holding means.

The scanner 2 comprises a reading section 5 for skimming through the originals that have been separated and fed one sheet at a time to the sheet-feed opening 4; a document table glass 9, serving as another reading section, for directly placing the originals thereupon in order to read the information thereof; and document reading means 20 that skims through the originals that pass the reading section 5 or the originals that have been placed on the document table glass 9.

A description of the image reading operation of the scanner 2 having the above-described structure will now be given.

Figure 3:
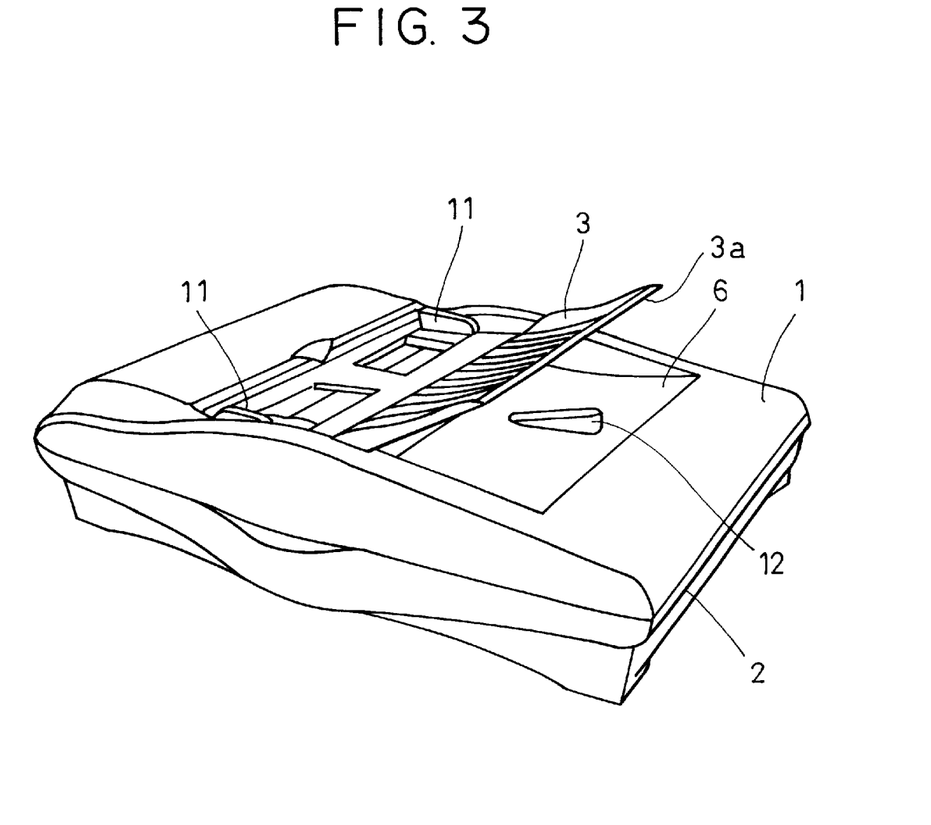
FIG. 3 is a perspective view showing the state of the image reading device when an image reading operation is carried out using the document feeder.

A description of the image reading operation using the document feeder 1 will be given. First, as shown in FIG. 3, the document feeder 1 is in a closed state. In this closed state, originals are set on the sheet-feed tray 3, and, for example, a reading start switch is turned on. When the reading start switch is turned on, a sheet feed roller (not shown) rotates, so that the originals separated and fed one sheet at a time to the sheet feed opening 4. Thereafter, by, for example, transporting rollers 21 to 25, each original passes through a document transporting path 16 (shown in FIG. 4), which is a sheet transporting path, and is transported to the reading section 5.

Then, while the original is being transported onto the reading section 5 of the scanner 2, the document reading means 20 skims through and reads the information on the original. After the pieces of information have been read, the originals are transported to the sheet-discharge opening 10 as indicated by the arrow shown in FIG. 4, and are discharged onto the sheet discharge tray 6.

A description of the case where the originals are directly placed upon the document table glass 9 of the scanner 2 in order to read the information of the originals without using the document feeder 1 will now be given.

In this case, as shown in FIG. 1, with the hinge shaft 8 serving as a fulcrum, the document feeder 1 is rotated upward on the hinge shaft 8, and is opened in order to expose the document table glass 9 of the scanner 2. The original is then placed directly on the document table glass 9. After the original has been directly placed on the document table glass 9, the document feeder 1 is closed. When the reading start switch is turned on, the document reading means 20 moves in the reading direction (the direction of the arrow in FIG. 4), causing the information on the original to be read.

Figure 4:
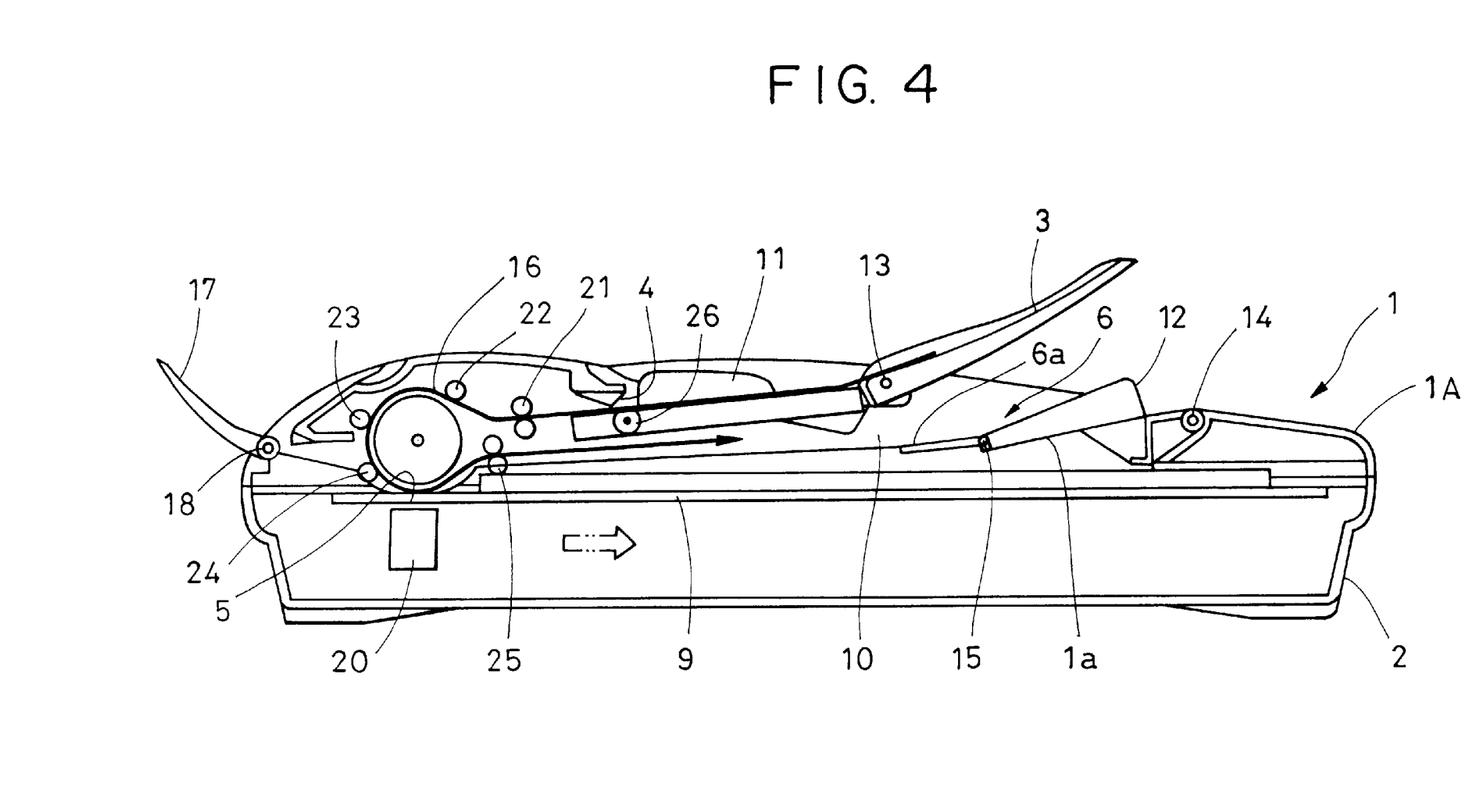
FIG. 4 is a sectional view showing the state of the image reading device when an image reading operation is carried out by the image reading device.
Figure 5:
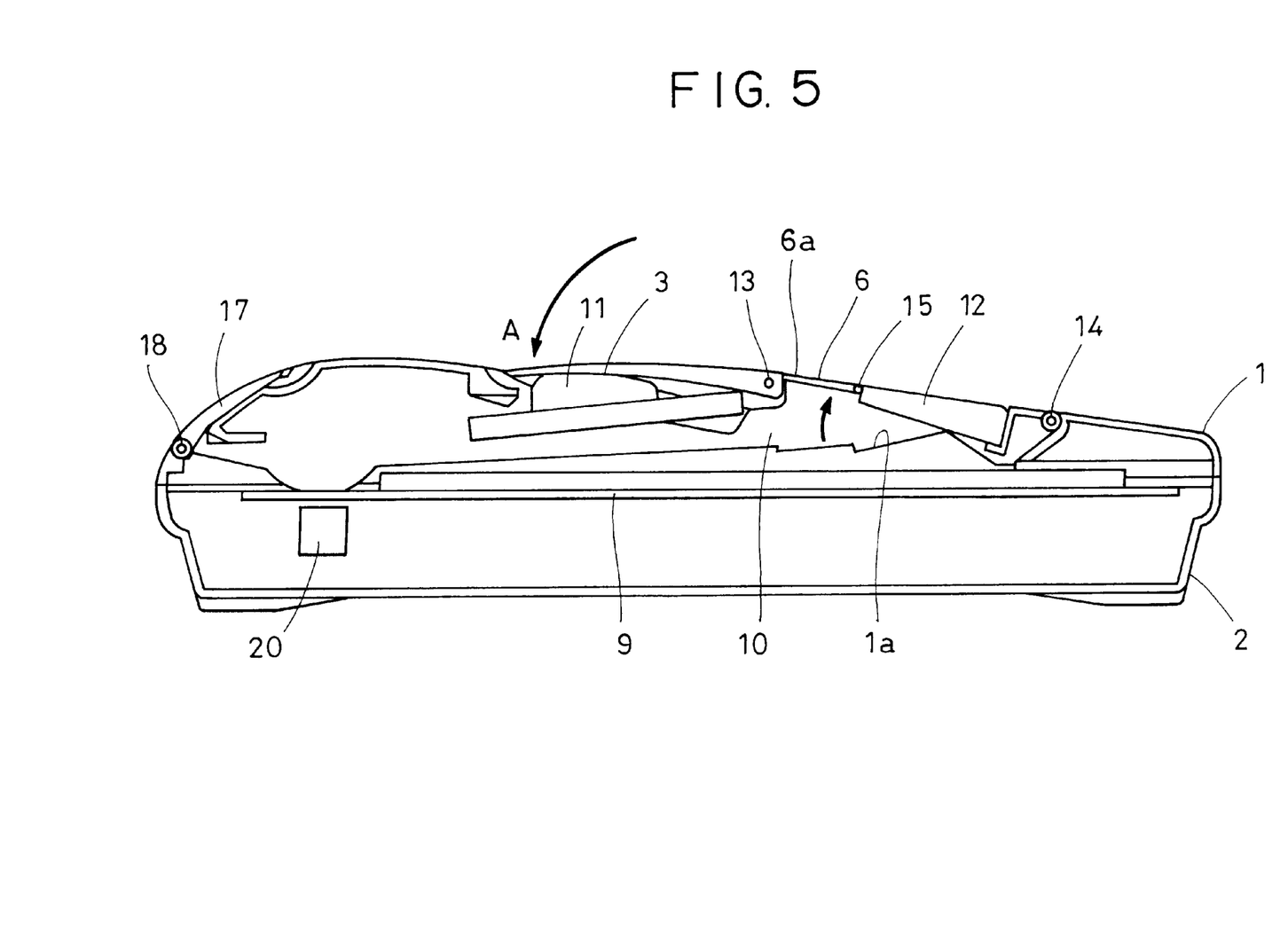
FIG. 5 is a side sectional view showing the situation where a sheet-feed opening and a sheet-discharge opening of the image reading device are being covered by a sheet-feed tray and a sheet-discharge tray.

In FIG. 4, reference numeral 17 denotes a thick-sheet feed tray. The thick-sheet feed tray 17 is mounted at the body 1A of the document feeder 1 so as to be openable through a rotating shaft 18. Here, although the thick-sheet feed tray 17 is ordinarily closed as shown in FIG. 5 (described later), when a thick original is to be read, the thick-sheet feed tray 17 is opened as shown in FIG. 4.

When a thick original is to be read, the thick-sheet feed tray 17 opens. After the thick original has been set upon the thick-sheet feed tray 17, when, for example, the reading start switch is turned on, the sheet feed roller (not shown) rotates in order to transport the thick original to the reading section 5, which skims through and reads the information on the thick original. After the information has been read in this way, as indicated by the arrow in FIG. 4, the original is transported to the sheet-discharge opening 10 and is discharged onto the sheet-discharge tray 6.

As mentioned above, in the document feeder 1, dust and dirt tend to accumulate on the sheet-feed tray 3. The dust and dirt are brought into the document feeder 1 due to the transportation of an original. This is believed to be a cause for the document feeder 1 to become defective.

To overcome this problem, in the embodiment, the sheet-feed tray 3 is provided on the document feeder body 1A so as to be rotatable through a rotating shaft 13 shown in FIG. 4. When the document feeder 1 is not used, the sheet-feed tray 3 is subjected to inversion rotation on the rotating shaft 13, serving as a fulcrum, in the direction of arrow A shown in FIG. 5, so that the sheet-feed opening 4 is covered thereby. In other words, the sheet-feed tray 3 has a structure that allows it to function as a cover that covers the sheet-feed opening 4 when the document feeder 1 is not used.

By subjecting the sheet-feed tray 3 to inversion rotation when the document feeder 1 is not used in order to move it to a location where it covers the sheet-feed opening 4, the sheet-feed opening 4 is covered. This makes it possible to prevent the entry of foreign matter into the body 1A of the document feeder 1.

Figure 6:
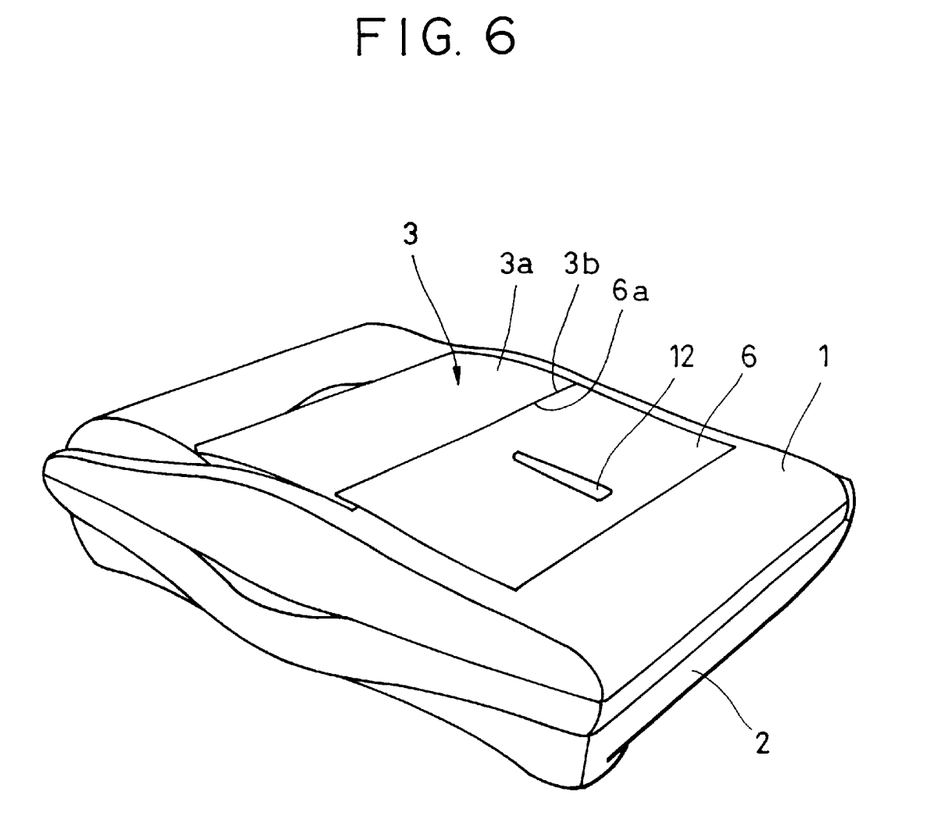
FIG. 6 is a perspective view showing the situation where the sheet-feed opening and the sheet-discharge opening have been covered by the sheet-feed tray and the sheet-discharge tray.
Figure 7:
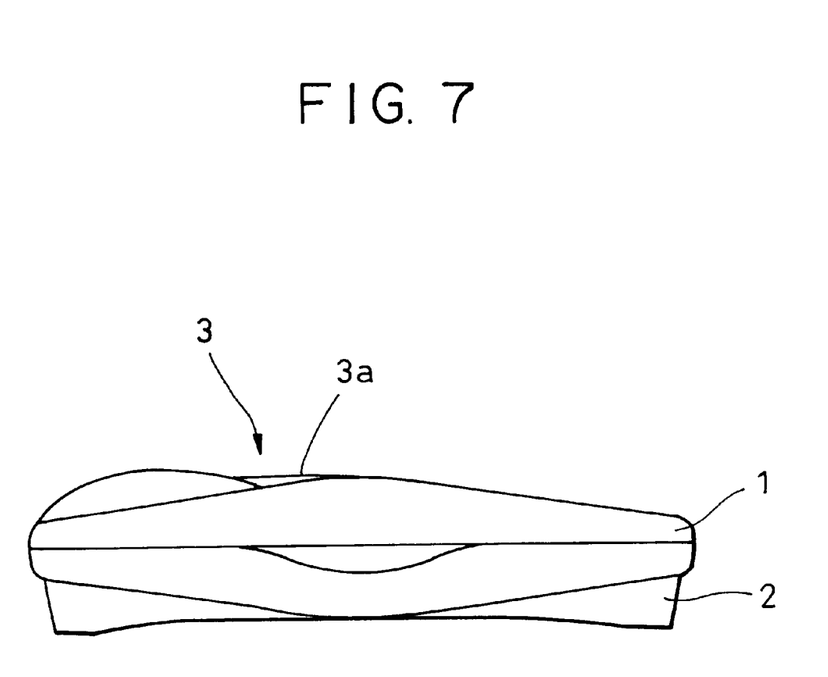
FIG. 7 is a side view showing the situation where the sheet-feed opening and the sheet-discharge opening have been covered by the sheet-feed tray and the sheet-discharge tray.
Figure 8:
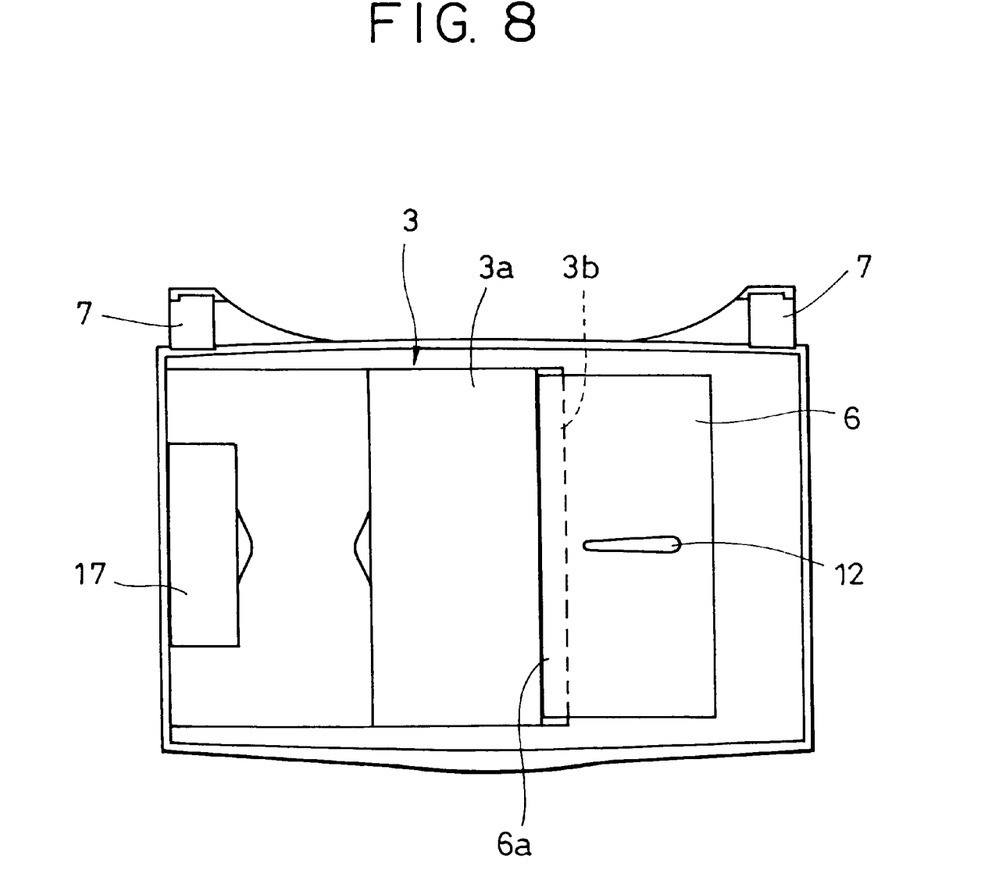
FIG. 8 is a plan view showing the situation where the sheet-feed opening and the sheet-discharge opening have been covered by the sheet-feed tray and the sheet-discharge tray.

When the sheet-feed tray 3 is made to function as a cover that covers the sheet-feed opening 4, in the state in which the sheet-feed opening 4 is covered as shown in FIGS. 6, 7, and 8, a back surface 3a, which is a surface disposed opposite to a sheet-loading surface of the sheet-feed tray 3, forms an exterior portion of the surface of the document feeder body 1A.

By forming the surface of the document feeder body 1A by the back surface 3a of the sheet-feed tray 3 that has been subjected to inversion rotation when covering the sheet-feed opening 4, when the document feeder 1 is not used, the sheet-feed tray 3 does not protrude from the body 1A of the sheet feeder 1, as a result of which the sheet-feed tray 3 does not get in the way and the sheet feeder does not give the impression of having a complicated external appearance.

As mentioned above, when foreign matter, such as dust and dirt, accumulate on the sheet-discharge tray 6, it may enter inside the body 1A of the document feeder 1 from the sheet-discharge opening 10. Therefore, in the embodiment, the sheet-discharge tray 6 is provided on the document feeder body 1A so as to be rotatable through a rotating shaft 14 shown in FIG. 4. The sheet-discharge tray 6 is rotated upward on the rotating shaft 14, serving as a fulcrum, in the direction of the arrow B shown in FIG. 5 in order to cover the sheet-discharge opening 10 when the document feeder 1 is not used. In other words, the sheet-discharge tray 6 has a structure that allows it to function as a cover that covers the sheet-discharge opening 10 when the document feeder 1 is not used.

When the document feeder 1 is not used, by rotating the sheet-discharge tray 6 upward in order to move it to a location where it covers the sheet-discharge opening 10, the sheet-discharge opening 10 is covered. This makes it possible to prevent the entry of foreign matter inside the sheet feeder body 1A.

In this embodiment, when, in order to cover the sheet-discharge opening 10, the sheet-discharge tray 6 is moved to form the sheet-loading-surface side thereof as an exterior portion that forms the surface of the document feeder body 1A, an area of movement of the sheet-discharge tray 6 can be made small, thereby making it possible to use space efficiently.

In this embodiment, the sheet-discharge tray 6 is rotated in response to the rotation of the sheet-feed tray 3. More specifically, when the sheet-feed tray 3 rotates on the rotating shaft 13, serving as a fulcrum, from the state shown in FIG. 4, a sheet-feeder-body-side end portion 3b (see FIG. 8) of the sheet-feed tray 3 is such as to contact the bottom surface of a rotating-side end portion 6a of the sheet-discharge tray 6.

Accordingly, when the sheet-feed tray 3 is rotated, the rotating-side end portion 6a of the sheet-discharge tray 6 is lifted by the document-feeder-body-side end portion 3b of the sheet-feed tray 3, so that the sheet-discharge tray 6 is rotated upward to the location where it covers the sheet-discharge opening 10. By causing the sheet-discharge tray 6 to rotate in response to the rotation of the sheet-feed tray 3, the sheet-feed opening 4 and the sheet-discharge opening 10 can be easily covered.

In the state in which the sheet-feed opening 4 and the sheet-discharge opening 10 are covered, as shown in FIG. 6, the document-feeder-body-side end portion 3b of the sheet-feed tray 3 supports the rotating-side end portion 6a of the sheet-discharge tray 6 from therebelow, so that the sheet-feed tray 3 and the sheet-discharge tray 6, which are adjacent each other, can form an essentially continuous exterior surface. Even when the sheet-feed tray 3 is made to support the sheet-discharge tray 6, the sheet-feed-opening-side portion of the sheet-feed tray 3 does not rise.

Figure 9:
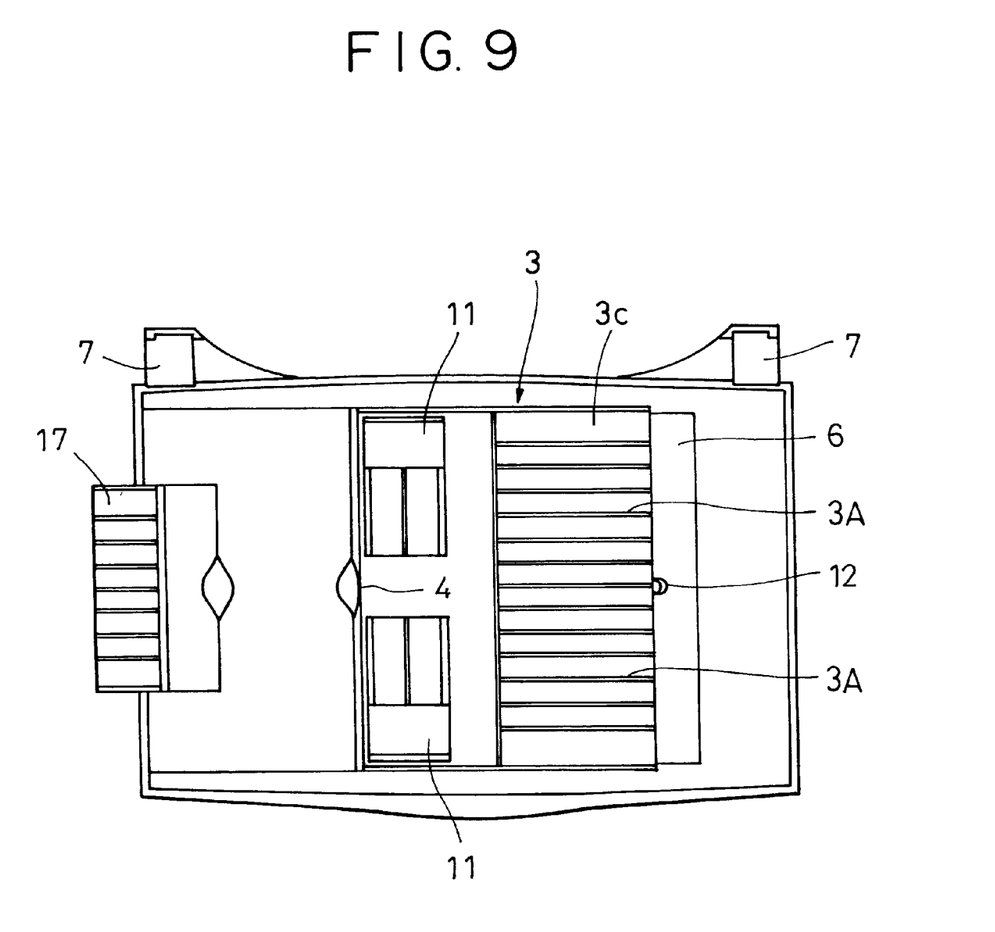
FIG. 9 is a plan view of the image reading device.

FIG. 9 is a plan view of the scanner 2. In FIG. 9, reference numerals 11 denote a pair of side regulating guides disposed between the sheet-feed tray 3 and the sheet-feed opening 4 and on both sides of an original in the widthwise direction thereof. Here, the side regulating guides 11 are mounted so as to be slidable in a direction perpendicular to a sheet feeding direction. By pressing an original from the direction perpendicular to the sheet feeding direction by the side regulating guides 11, oblique movement of the original is prevented.

In this embodiment, the side regulating guides 11 are constructed so as to be movable to locations that prevent them from interfering with the covering of the sheet-feed opening 4 by the sheet-feed tray 3 when the sheet-feed tray 3 is rotated to cover the sheet-feed opening 4.

In FIG. 9, reference numerals 3A denote a plurality of ribs that are provided at a sheet-loading surface 3c of the sheet-feed tray 3 so as to protrude therefrom. These ribs 3A make it possible to reduce friction between an original and the sheet-feed tray 3. By providing such ribs 3A, a gap can be formed between the original and the sheet-feed tray 3, so that a person can easily put his/her finger below the original, thereby making it easier to remove the original.

In FIG. 8, reference numeral 12 denotes a protruding portion that is provided on the sheet-discharge tray 6. As shown in, for example, in FIGS. 3 and 4, the protruding portion 12 is usually supported by an inclined surface so as to protrude upward from the sheet-discharge tray 6. By forming the protruding portion 12, a discharged original can be raised from the sheet-discharge tray 6. As a result, a gap can be formed between the original and the sheet-discharge tray 6, so that a person can easily put his/her finger below the original, thereby making it easier to remove the original.

Here, the protruding portion 12 is held by the sheet-discharge tray 6 so as to be rotatable through a rotating shaft 15 shown in FIG. 4. Accordingly, when the sheet-discharge tray 6 is rotated as shown in FIG. 5, an axial bearing of the protruding portion 12 is such as to move upward with the sheet-discharge tray 6.

When the axial bearing of the protruding portion 12 moves upward with the sheet-discharge tray 6, the protruding portion 12 relatively retreats to the inside of the sheet-discharge tray 6. The sheet-discharge tray 6 eventually rotates to the location where it covers the sheet-discharge opening 10, so that the protruding portion 12 moves completely into the inside of the sheet-discharge tray 6 so as not to protrude from the sheet-discharge tray 6.

In this way, when the protruding portion 12 is rotatably held by the sheet-discharge tray 6, and is made to protrude from the sheet-discharge tray 6 when the sheet-discharge tray 6 is used, it is easier to remove the sheets on the sheet-discharge tray 6. On the other hand, when the sheet-discharge tray 6 is not used, the protruding portion 12 does not protrude from the sheet-discharge tray 6, thereby making it possible to prevent the exterior from being complicated.

As can be understood from the foregoing description, the document feeder 1 has been described as having a structure in which, after the originals have been separated and fed from the sheet-feed tray 3 one sheet at a time in order to read the information thereof, the originals lit are discharged to the sheet-discharge tray 6 disposed below the sheet-feed tray 3. However, the present invention is not limited thereto. For example, the present invention may be applied to a document feeder having a structure in which the sheet-discharge tray is provided above the sheet-feed tray, and in which, after the originals have been separated and fed from the sheet-feed tray 3 one sheet at a time in order to read the information thereof, the originals are discharged to the sheet-discharge tray disposed above the sheet-feed tray.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. A sheet feeder comprising:
    a sheet-feed opening for feeding sheets into a sheet transporting path that is provided inside a body of the sheet feeder;
    a sheet-discharge opening for discharging from the body of the sheet feeder the sheets that have passed through the sheet-transporting path;
    sheet-holding means for holding the sheet to be fed into the sheet-transporting path through said sheet-feed opening, said sheet-holding means being rotatably attached to the body of the sheet feeder, and said sheet-holding means being movable between a position where the sheet-holding means holds the sheets and a position where said sheet-holding means covers said sheet-feed opening; and
    discharged-sheet holding means for holding the sheets that have been discharged through said sheet discharge opening, said discharged-sheet holding means being rotatably attached to the body of the sheet feeder, and said discharged-sheet holding means being movable between position where said discharged-sheet holding means being movable between a position where said discharged-sheet holding means holds the sheets that have been discharged from the sheet-discharge opening and a position where the discharged-sheet holding means covers the sheet-discharge opening;
    wherein, when one of the sheet-feed opening and the sheet-discharge opening is to be covered, one of the sheet-holding means and the discharged-sheet holding means is subjected to inversion rotation whereby a surface of one of the sheet-holding means and the discharged-sheet holding means that is formed opposite to a sheet-loading surface thereof forms a surface of the body of the sheet feeder in order to cover the sheet-feed opening and the sheet-discharge opening; and
    wherein, when the other of the sheet-feed opening and the sheet-discharge opening is to be covered, the other of the sheet-holding means and the discharged-sheet holding means is moved whereby the sheet-loading surface of the other of the sheet-holding means and the discharged-sheet holding means that was moved forms the surface of the body of the sheet feeder to cover the other of the sheet-feed opening and the sheet-discharge opening.

2. A sheet feeder according to claim 1, wherein the sheet-feed opening is disposed above the sheet-discharge opening and the sheet-discharge opening is disposed below the sheet-holding means.

3. A sheet feeder according to claim 2, wherein the discharged-sheet holding means rotates to the position where the discharged-sheet holding means covers the sheet-discharge opening in response to the inversion rotation of the sheet-holding means when the sheet-feed opening is to be covered.

4. A sheet feeder according to claim 2 or claim 3, wherein, when the sheet-feed opening and the sheet-discharge opening have been covered, the surface of the sheet-holding means forming a surface of the body of the sheet feeder and the sheet-loading surface of the discharged-sheet holding means are adjacent each other thereby forming the surface of the body of the sheet feeder.

5. A sheet feeder according to any one of claims 2 or 3, wherein the discharged-sheet holding means comprises a protruding portion that protrudes upward from the sheet-loading surface of the discharged-sheet holding means when the discharged-sheet holding means is in the sheet-holding position, the protruding portion retreating from the sheet-loading surface of the discharged-sheet holding means when the discharged-sheet holding means is in the position where the discharged-sheet holding means covers the sheet-discharge opening.

6. A sheet feeder according to claim 1, wherein the sheet-discharge opening is disposed above the sheet-feed opening and the sheet-feed opening is disposed below the discharged-sheet holding means.

7. A sheet feeder comprising:
 a sheet-feed opening for feeding sheets into a sheet transporting path that is provided inside a body of the sheet feeder;
 a sheet-discharge opening for discharging from the body of the sheet feeder the sheets that have passed through the sheet-transporting path;
 sheet-holding means for holding the sheets to be fed into the sheet-transporting path through said sheet-feed opening, said sheet-holding means being rotatably attached to the body of the sheet feeder, and said sheet-holding means being movable between a position where the sheet-holding means holds the sheets and a position where the sheet-holding means covers the sheet-feed opening; and
 discharged-sheet holding means for holding the sheets that have been discharged through said sheet discharge opening, said discharged-sheet holding means being rotatably attached to the body of the sheet feeder, and said discharged-sheet holding means being movable between a position where the discharged-sheet holding means holds the sheets that have been discharged from the sheet-discharge opening and a position where the discharged-sheet holding means covers the sheet-discharge opening;
 wherein one of the sheet holding means and the discharged-sheet holding means is disposed above the other when each are in the sheet holding position, and when the one of the sheet holding means and the discharged-sheet holding means disposed above the other in the sheet holding position is being subjected to inversion rotation whereby a surface thereof disposed opposite to a sheet-loading surface forms a surface of the body of the sheet feeder in order to cover one of the sheet-feed opening and the sheet-discharge opening; and
 wherein, when the other of the sheet holding means and the discharged-sheet holding means is used to cover the other of the sheet-feed opening and the sheet-discharge opening, the other of the sheet holding means and the discharged-sheet holding means is moved so that the sheet-loading surface of the other of the sheet holding means and the discharged-sheet holding means that was moved forms the surface of the body of the sheet feeder in order to cover the other of the sheet-feed opening and the sheet-discharge opening.

8. A sheet feeder according to claim 7, wherein, when one of the sheet-feed opening and the sheet-discharge opening is to be covered, one of the sheet-holding means and the discharged-sheet holding means is subjected to inversion rotation so that the surface of the one of the sheet-holding means and the discharged-sheet holding means that is formed opposite to the sheet-loading surface thereof forms the surface of the body of the sheet feeder so as to cover the one of the sheet-feed opening and the sheet-discharge opening; and
 wherein, when one of the sheet-feed opening and the sheet-discharge opening is covered, one of the sheet-holding means and the discharged-sheet holding means is moved so that the sheet-loading surface of the one of the sheet-holding means and the discharged-sheet holding means forms the surface of the body of the sheet feeder in order to cover the one of the sheet-feed opening and the sheet-discharge opening.

9. A sheet feeder according to either claim 7 or claim 8, wherein the sheet-feed opening is disposed above the sheet-discharge opening, and the sheet-discharge opening is disposed below the sheet-holding means.

10. A sheet feeder according to claim 9, wherein the discharged-sheet holding means rotates to the position where the discharged-sheet holding means covers the sheet-discharge opening in response to the inversion rotation of the sheet-holding means when the sheet-feed opening is to be covered.

11. A sheet feeder according to claim 10, wherein, when the sheet-feed opening and the sheet-discharge opening have been covered, the surface of the sheet-holding means opposite to the sheet-loading surface and the sheet-loading surface of the discharged-sheet holding means are adjacent each other so as to form the surface of the body of the sheet feeder.

12. A sheet feeder according to claim 9, wherein the discharged-sheet holding means comprises a protruding portion that protrudes upward from the sheet-loading surface of the discharged-sheet holding means when the discharged-sheet holding means is in the sheet-holding position, the protruding portion retreating from the sheet-loading surface of the discharged-sheet holding means when the discharged-sheet holding means is in the position where the discharged-sheet holding means covers the sheet-discharge opening.

13. A sheet feeder according to claim 7, wherein the sheet-discharge opening is disposed above the sheet-feed opening and the sheet-feed opening is disposed below the discharged-sheet holding means.

14. An image reading device comprising:
 a reading section that reads information of the sheets; and
 a sheet feeder, comprising:
  a sheet-feed opening for feeding sheets into a sheet transporting path that is provided inside a body of the sheet feeder;
  a sheet-discharge opening for discharging from the body of the sheet feeder the sheets that have passed through the sheet-transporting path;
  sheet-holding means for holding the sheet to be fed into the sheet-transporting path through said sheet-feed opening, said sheet-holding means being rotatably attached to the body of the sheet feeder, and said sheet-holding means being movable between a position where the sheet-holding means holds the sheets and a position where said sheet-holding means covers said sheet-feed opening; and
  discharged-sheet holding means for holding the sheets that have been discharged through said sheet discharge opening, said discharged-sheet holding means being rotatably attached to the body of the sheet feeder, and said discharged-sheet holding means being movable between position where said discharged-sheet holding means holds the sheets that have been discharged from the sheet-discharge opening and a position where the discharged-sheet holding means covers the sheet-discharge opening;

wherein, when one of the sheet-feed opening and the sheet-discharge opening is to be covered, one of the sheet-holding means and the discharged-sheet holding means is subjected to inversion rotation whereby a surface of one of the sheet-holding means and the discharged-sheet holding means that is formed opposite to a sheet-loading surface thereof forms a surface of the body of the sheet feeder in order to cover the sheet-feed opening and the sheet-discharge opening; and wherein, when the other of the sheet-feed opening and the sheet-discharge opening is to be covered, the other of the sheet-holding means and the discharged-sheet holding the means is moved whereby the sheet-loading surface of the other of the sheet-holding means and the discharged-sheet holding means that was moved forms the surface of the body of the sheet feeder to cover the other of the sheet-feed opening and the sheet-discharge opening feeds the sheets to the reading section.

15. An image reading device according to claim 14, wherein the sheet-feed opening is disposed above the sheet-discharge opening and the sheet-discharge opening is disposed below the sheet-holding means.

16. An image reading device according to claim 15, wherein the discharged-sheet holding means rotates to the position where the discharged-sheet holding means covers the sheet-discharge opening in response to the inversion rotation of the sheet-holding means when the sheet-feed opening is to be covered.

17. An image reading device according to claim 15 or claim 16, wherein, when the sheet-feed opening and the sheet-discharge opening have been covered, the surface of the sheet-holding means forming a surface of the body of the sheet feeder and the sheet-loading surface of the discharged-sheet holding means are adjacent each other thereby forming the surface of the body of the sheet feeder.

18. An image reading device according to claim 15, wherein the discharged-sheet holding means comprises a protruding portion that protrudes upward from the sheet-loading surface of the discharged-sheet holding means when the discharged-sheet holding means is in the sheet-holding position, the protruding portion retreating from the sheet-loading surface of the discharged-sheet holding means when the discharged-sheet holding means is in the position where the discharged-sheet holding means covers the sheet-discharge opening.

19. An image reading device according to claim 14, wherein the sheet-discharge opening is disposed above the sheet-feed opening and the sheet-feed opening is disposed below the discharged-sheet holding means.

20. An image reading device comprising:
a reading section that reads information of sheets; and
a sheet feeder, comprising:
  a sheet-feed opening for feeding sheets into a sheet transporting path that is provided inside a body of the sheet feeder;
  a sheet-discharge opening for discharging from the body of the sheet feeder the sheets that have passed through the sheet-transporting path;
  sheet-holding means for holding the sheets to be fed into the sheet-transporting path through said sheet-feed opening, said sheet-holding means being rotatable attached to the body of the sheet feeder, and said sheet-holding means being movable between a position where the sheet-holding means holds the sheets and a position where the sheet-holding means covers the sheet-feed opening; and
  discharge-sheet holding means for holding the sheets that have been discharged through said sheet discharge opening, said discharged-sheet holding means being rotatably attached to the body of the sheet feeder, and said discharged-sheet holding means being movable between a position where the discharged-sheet holding means holds the sheets that have been discharged from the sheet-discharge opening and a position where the discharged-sheet holding means covers the sheet-discharge opening;
  wherein one of the sheet holding means and the discharged-sheet holding means is disposed above the other when each are in the sheet holding position, and when the one of the sheet holding means and the discharged-sheet holding means disposed above the other in the sheet holding position is being subjected to inversion rotation whereby a surface thereof disposed opposite to a sheet-loading surface forms a surface of the body of the sheet feeder in order to cover one of the sheet-feed opening and the sheet-discharge opening; and
  wherein, when the other of the sheet holding means and the discharged-sheet holding means is used to cover the other of the sheet-feed opening and the sheet-discharge opening, the other of the sheet holding means and the discharged-sheet holding means is moved so that the sheet-loading surface of the other of the sheet holding means and the discharged-sheet holding means that was moved forms the surface of the body of the sheet feeder in order to cover the other of the sheet-feed opening and the sheet-discharge opening,
  wherein the sheet feeder feeds the sheets to the reading section.

21. An image reading device according to claim 20, wherein, when one of the sheet-feed opening and the sheet-discharge opening is to be covered, one of the sheet-holding means and the discharged-sheet holding means is subjected to inversion rotation so that the surface of the one of the sheet-holding means and the discharged-sheet holding means that is formed opposite to the sheet-loading surface thereof forms the surface of the body of the sheet feeder so as to cover the one of the sheet-feed opening and the sheet-discharge opening; and wherein, when one of the sheet-feed opening and the sheet-discharge opening is covered, one of the sheet-holding means and the discharged-sheet holding means is moved so that the sheet-loading surface of the one of the sheet-holding means and the discharged-sheet holding means forms the surface of the body of the sheet feeder in order to cover the one of the sheet-feed opening and the sheet-discharge opening.

22. An image reading device according to either claim 20 or claim 21, wherein the sheet-feed opening is disposed above the sheet-discharge opening, and the sheet-discharge opening is disposed below the sheet-holding means.

23. An image reading device according to claim 22, wherein the discharged-sheet holding means rotates to the position where the discharged-sheet holding means covers the sheet-discharge opening in response to the inversion rotation of the sheet-holding means when the sheet-feed opening is to be covered.

24. An image reading device according to claim 23, wherein, when the sheet-feed opening and the sheet-discharge opening have been covered, the surface of the sheet-holding means opposite to the sheet-loading surface and the sheet-loading surface of the discharged-sheet holding means are adjacent each other so as to form the surface of the body of the sheet feeder.

25. An image reading device according to claim 23, wherein the discharged-sheet holding means comprises a protruding portion that protrudes upward from the sheet-loading surface of the discharged-sheet holding means when the discharged-sheet holding means is in the sheet-holding position, the protruding portion retreating from the sheet-loading surface of the discharged-sheet holding means when the discharged-sheet holding means is in the position where the discharged-sheet holding means covers the sheet-discharge opening.

26. An image reading device according to claim 20, wherein the sheet-discharge opening is disposed above the sheet-feed opening and the sheet-feed opening is disposed below the discharged-sheet holding means.

* * * * *

UNITED STATES PATENT AND TRADEMARK OFFICE
CERTIFICATE OF CORRECTION

PATENT NO.    : 6,612,561 B2  
DATED         : September 2, 2003  
INVENTOR(S)   : Naofumi Sekine It is certified that error appears in the above-identified patent and that said Letters Patent is hereby corrected as shown below:

<u>Column 5,</u>  
Line 38, "i(F)" should be deleted.

<u>Column 10,</u>  
Line 30, "sheet discharge" should read -- sheet-discharge --.  
Line 33, "being movable" should be deleted.  
Line 34, should be deleted.  
Line 35, "means" should be deleted.

<u>Column 13,</u>  
Line 4, "position" should read -- a position --.  
Line 15, "cover" should read -- cover one of --.  
Line 21, "the means" should read -- means --.  
Line 25, "opening feeds" should read -- opening. --.  
Line 26, "the sheets to the reading section." should be deleted.

Signed and Sealed this

Thirteenth Day of January, 2004

JON W. DUDAS  
*Acting Director of the United States Patent and Trademark Office*